Aug. 25, 1959
W. H. HARRIS
2,901,286
MECHANICALLY OPERABLE COVER AND RACK FOR TRUCKS AND SIMILAR VEHICLES
Filed Jan. 10, 1958
2 Sheets-Sheet 1
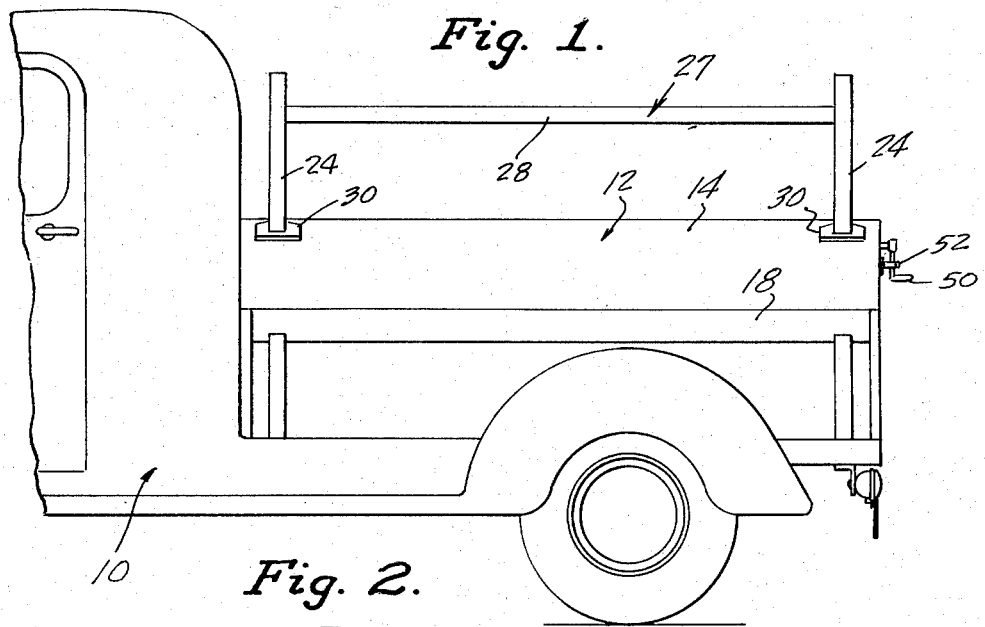
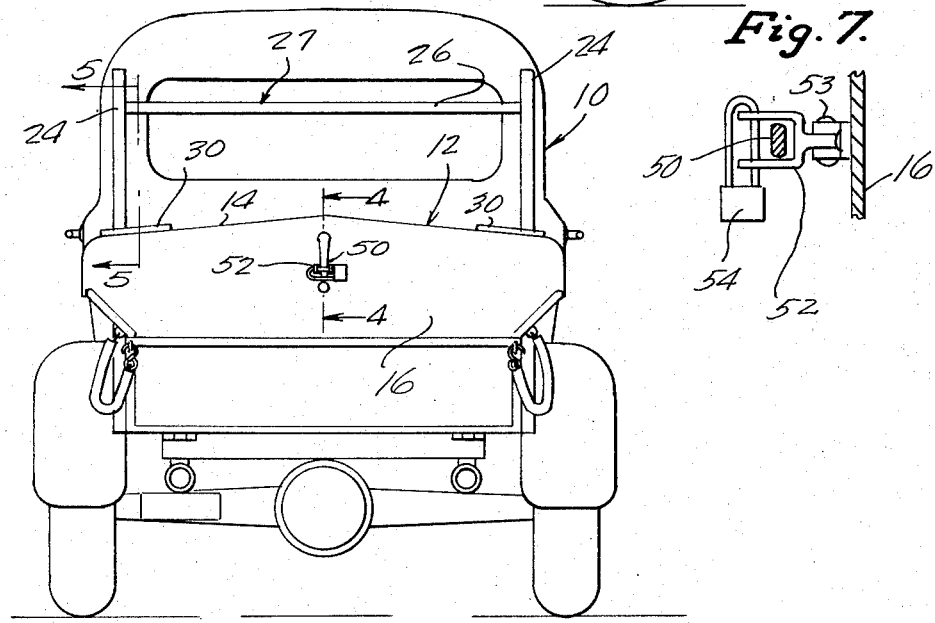
INVENTOR.
WILLIAM H. HARRIS,
BY
McMorrow, Berman & Davidson
ATTORNEYS.

Aug. 25, 1959
W. H. HARRIS
2,901,286
MECHANICALLY OPERABLE COVER AND RACK FOR TRUCKS AND SIMILAR VEHICLES
Filed Jan. 10, 1958
2 Sheets-Sheet 2
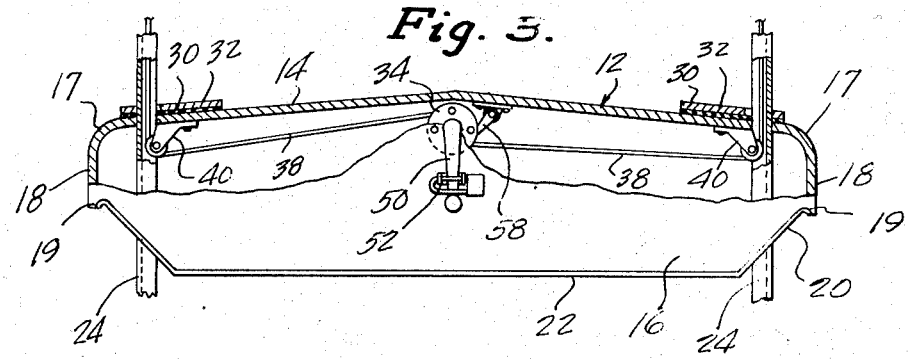
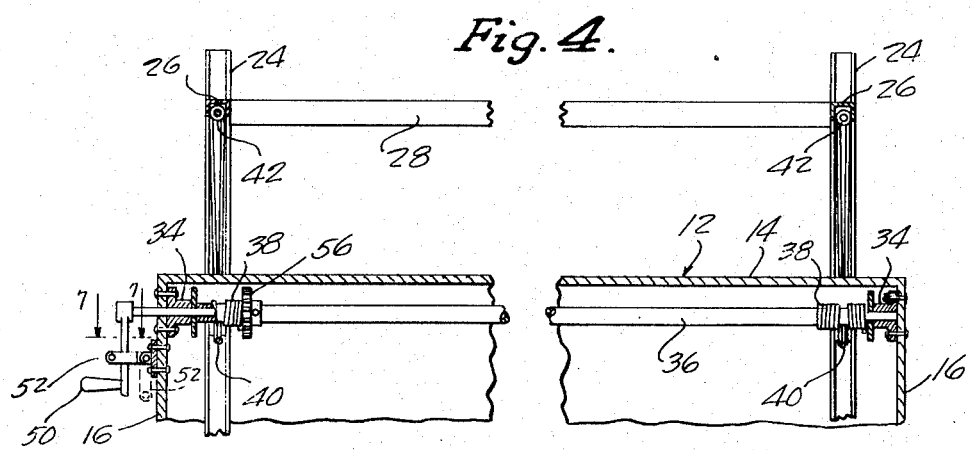
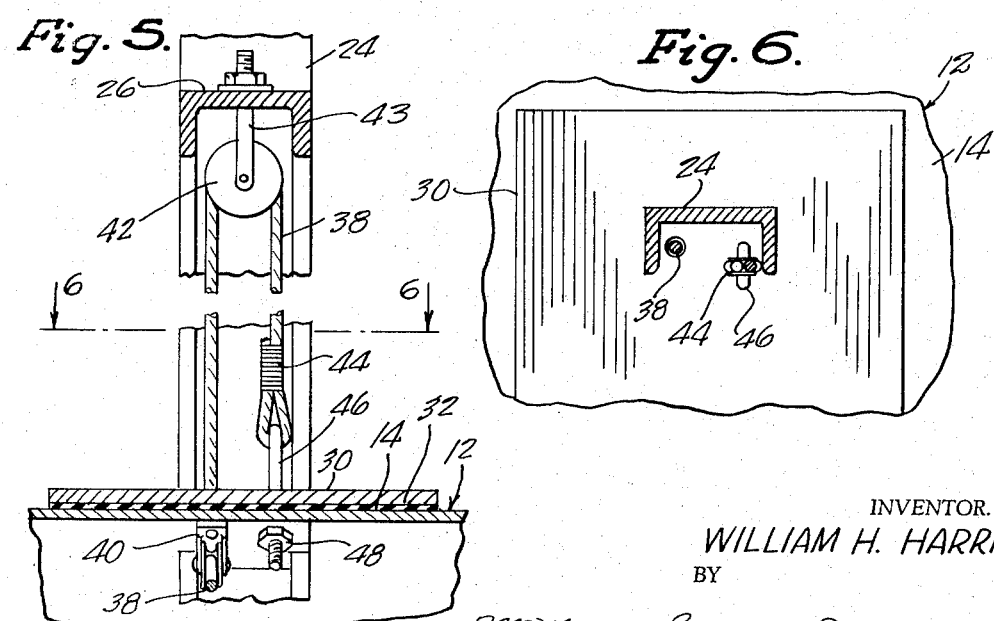
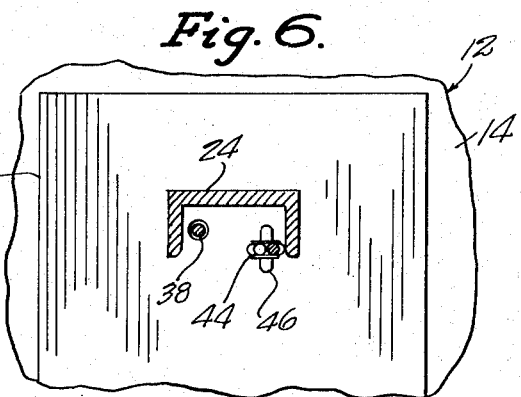
INVENTOR.
WILLIAM H. HARRIS,
BY
McMorrow, Berman & Davidson
ATTORNEYS.

United States Patent Office 2,901,286
Patented Aug. 25, 1959

2,901,286

MECHANICALLY OPERABLE COVER AND RACK FOR TRUCKS AND SIMILAR VEHICLES

William H. Harris, San Antonio, Tex.

Application January 10, 1958, Serial No. 708,279

5 Claims. (Cl. 296—100)

This invention relates to a rack and to a mechanically operable cover, said cover being swiftly raised or lowered, when mounted upon an otherwise conventional light truck.

The main object of the present invention is to provide a mechanically operable device of the character stated which will permit a weather proof cover to be swiftly and easily raised or lowered, with said cover being ordinarily lowered in a position over the bed of the truck, to provide a closed compartment in which articles may be transported.

A further object is to so form and locate the rack or frame supporting said cover, as to permit the same to be used for carrying ladders, scaffolding, lumber, pipes, or any similar materials requiring a long clearance.

Another object is to provide a device of the character stated which will be so designed as to permit items such as paint, tools, fabricated equipment, small parts for machinery, cardboard-boxed items, plywood or other objects which must be protected from the elements, to be hauled under the lowered cover in complete safety from rain, wind, road dust, etc.

Another object is to permit the cover to be raised to a position at such a height from the bed of the truck as to permit benches to be placed in the truck bed, on which benches may be seated workers who are being transported, protected from the sun or rain, the device being designed, in this connection, to facilitate the attachment of side curtains and a rear curtain.

Another object is to provide a device of the character stated which will be mountable upon a conventional pick-up truck, with minimum modification and redesign of said truck.

Another object is to provide a cover which will be designed to facilitate raising and lowering of the device, and will further be designed to facilitate locking of the cover in any position to which it is moved.

A further object is to form the device in a manner such that it can be manufactured at low cost, sufficient to make the same commercially feasible.

Other objects will appear from the following description, the claims appended thereto, and from the annexed drawing, in which like reference characters designate like parts throughout the several views, and wherein:

Figure 1 is a fragmentary side elevational view of a truck equipped with a rack and cover according to the present invention;

Figure 2 is a rear elevational view of the truck and of the invention;

Figure 3 is an enlarged view of the device partly in rear elevation and partly in transverse section;

Figure 4 is a view on the same scale as Figure 3, taken longitudinally through the device, substantially on line 4—4 of Figure 2;

Figure 5 is a greatly enlarged, detail sectional view substantially on line 5—5 of Figure 2;

Figure 6 is a sectional view on the same scale as Figure 5, taken on line 6—6 of Figure 5; and Figure 7 is a detail sectional view, on a greatly enlarged scale, showing the locking means, and taken substantially on line 7—7 of Figure 4.

Referring to the drawing in detail, designated generally at 10 is a conventional pick-up truck, while at 12 there has been generally designated the cover and rack constituting the present invention.

The cover includes a canopy 14, which can be formed from aluminum sheet material or the like. Obviously, various fabrication arrangements can be utilized, but in a preferred embodiment the canopy would be fabricated from four pieces of material, two pieces for the respective ends and two halves for the top and side pieces. Alternatively, the device could be formed from a single piece of material, but in any event, the canopy preferably has the cross sectional shape shown to particular advantage in Figure 3, the canopy sloping downwardly slightly from the longitudinal median line thereof, and being formed (see Figure 4) with vertical front and rear end walls 16, 16. The downwardly sloping side portions of the canopy 14 merge along curved lines 17 into vertically depending side walls 18, which are adapted to be supported along their lower edges in longitudinally contacting relation to the rolled side flanges 19 of the upwardly divergent side walls 20 of the pick-up truck bed 22.

The invention further includes rectangularly spaced, vertically disposed channels, the channels at each end being in confronting relation, that is, being faced inwardly. The several channels form corner posts 24, there being a front pair of corner posts and a rear pair as shown in Figures 1 and 2. Fixedly connected between the posts of the front pair is a cross bar 26, a similar cross bar 26 being connected in the same fashion between the posts of the rear pair, as shown in Figure 4. Connected between the posts provided at each side of the device are longitudinal members 28. The members 26, 28 provide a rectangular, horizontal reinforcing frame at the corners of which the posts 24 are rigidly secured. There thus results a support rack or frame generally designated at 27, which can be used for supporting long pipe, lumber, or other material requiring a long clearance, that is, requiring projection rearwardly from the bed of the pick-up truck.

In any event, the posts 24 at their lower ends are fixedly engaged in the truck bed, and the mounting is facilitated by reason of the fact that conventionally the bed of a truck such as that shown is equipped with rack slots at the sides of the bed walls.

Fixedly secured to the top surface of the canopy 14, adjacent the respective sides thereof, are flat plates 30, which can be formed of aluminum or the like, and interposed between the plates 30 and the canopy surface are neoprene gaskets 32. Plate 30 and gaskets 32 have openings through which the posts 24 project, and minimum clearance is provided for the posts, thus to prevent leakage through the post-receiving openings.

Means for raising and lowering the canopy is provided, and as shown in Figure 4 includes a flange bearing bracket 34 fixedly secured to the inner surface of the rear end wall 16. An elongated shaft 36 extends longitudinally and centrally of the device, in close proximity to and below the midwidth portion of the canopy.

Shaft 36, adjacent its opposite ends, defines drums about which lifting cables 38 are coiled. A pair of lifting cables is provided at each end of the shaft 36, and as shown in Figure 3, the cables of each pair extend in opposite directions from their associated drum, being trained about pulleys or sheaves mounted upon brackets 40 secured to the underside of the canopy. After being trained about the pulleys, the cables 38 are extended upwardly within the channelled posts 24, and are trained about pulleys 42, carried by pulley brackets 43 vertically, adjustably mounted in the end portions of the cross bars 26.

Thereafter, the cables 38 extend back downwardly toward the canopy, and are provided with loops 44 connected to eye bolts 46 passing through openings of the plates 30, and secured to the canopy by nuts 48.

The shaft 36 at its opposite ends is provided with reduced end portions, journalled in the bearing brackets 34 mounted upon the inner surfaces of the walls 16. The reduced portions of the shaft 36 can be either integral with the shaft or fixedly secured thereto in coaxial alignment therewith, whichever is desired. In any event, the reduced rear end portion of shaft 36 projects out of the truck bed, and connected thereto is a crank 50.

Referring to Figures 4 and 7, the crank is normally locked against rotation through the provision of a pivoted, Y-shaped yoke 52, pivoted upon the adjacent end wall 16 for up-and-down swinging movement about the axis of a pin 53. Yoke 52 when swung upwardly embraces the crank 50 as shown in Figure 7, and a conventional padlock 54 can then be extended through aligned openings of the fork arms of the locking yoke 52 in the manner shown in Figure 7.

Further, ratchet-and-pawl means is provided for releasably engaging the elevating shaft 36 in selected positions to which it is rotated. To this end, there is provided a ratchet 56, secured to the shaft 36 for rotation therewith. A pawl 58 is mounted upon the underside of the canopy 14 as shown in Figure 3, and provides a simple, releasable locking device that will allow locking of the cover in any position to which it is elevated.

Thus, to raise the cover one need only turn the crank, in a direction to wind the cables upon the shaft, thus raising the cover until it is at the desired height. By flipping the pawl to the Figure 3 position, into engagement with the ratchet, the cover is held in the desired position.

To lower the cover, one first disengages the pawl from the ratchet, after which the crank is turned in a reverse direction until the cover is fully lowered.

The several edges of the canopy, it will be understood, would be provided with gasket means to prevent leakage. To this end, there may be provided strips of neoprene rubber or the like, glued to the underside of the several lips of the cover. These are not shown, the expedient being considered sufficiently obvious as not to require special illustration herein. When the cover is lowered, these edge gaskets provide a sealed engagement between the same and the bed of the truck.

Still further, the device has the desirable advantage of providing, when the cover is lowered, a completely protected compartment for small items that must be enclosed for protection from the elements. This compartment can be completely locked, through the provision of the locking means shown in Figure 7.

Still further, the cover, when raised, provides protection for objects or persons carried upon the truck bed. In this connection, the cover could be provided with side curtains of the "roll-up" type, these being omitted from the drawing but being easily attachable to the sides of the canopy if desired.

A further advantage of the device results in the fact that not only is the operation simple, but also, the installation of the device is carried out with equal ease. The construction is particularly designed to allow installation on conventional pick-up trucks, with minimum modification and redesign of the beds of said trucks. Still further, the device can be made at relatively low cost, and does not interfere with normal use of the truck in any way.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. The combination, with a truck bed, of a cover structure for said bed, comprising: a rack assembly extending upwardly from the truck bed; a canopy vertically slidable upon said assembly; and means for raising and lowering said canopy, said rack assembly including rectangularly spaced posts, the canopy having correspondingly spaced openings through which the posts extend, said rack assembly further including a rectangular, horizontal reinforcing frame disposed above the canopy and connected at its several corners rigidly to the several posts, said means for raising and lowering the canopy comprising a shaft journalled in the canopy and extending longitudinally and centrally thereof, cables coiled at one end about the shaft, and pulley means on the canopy and posts about which the cables are trained intermediate their ends, said cables being connected at their other ends to the canopy so as to raise and lower the canopy responsive to rotation of the shaft in respectively opposite directions.

2. A cover for a truck body comprising: a series of vertical, rectangularly spaced posts having lower ends rigidly connectible to a truck body; a canopy proportioned to overlie said body and having openings receiving the posts, the canopy being vertically slidable on the posts between lowered and raised positions; pulleys rotatably supported from the several posts; pulleys rotatably mounted on the underside of the canopy adjacent the several openings; a shaft journaled in opposite walls of the canopy for rotation by a user; and a plurality of cables, each of said cables being wound at one end upon the shaft and being extended intermediate its ends through one of said openings, each cable being trained about the canopy-supported pulley adjacent the associated opening through which the cable extends, and being trained also about the pulley mounted upon the post received in said associated opening, each cable being anchored to the canopy at its other end, for raising and lowering of the canopy responsive to rotation of the shaft in respectively opposite directions.

3. A cover for a truck body as in claim 2 wherein the posts are formed with channels opening toward the shaft, each cable being extended to its associated post-supported pulley within the channel of the post carrying said associated pulley.

4. A structure as in claim 3, further including longitudinal and transverse frame members connected between posts in a common horizontal plane to form a horizontal, rectangular, canopy-overlying support frame for objects being carried, at the corners of which frame the several posts are disposed, the posts projecting above said plane to cooperate with the longitudinal and transverse members in defining a cradle for the supported objects.

5. A structure as in claim 3 wherein the several post-supported pulleys depend from the transverse frame members in close proximity to the connection between the transverse frame members and the posts, within the channels of the posts.

References Cited in the file of this patent

UNITED STATES PATENTS

| | | |
|---|---|---|
| 1,568,895 | Lyons | Jan. 5, 1926 |
| 1,712,593 | Tucker | May 14, 1929 |
| 2,216,553 | Greene | Oct. 1, 1940 |
| 2,237,853 | Troche | Apr. 8, 1941 |
| 2,292,107 | Doepke | Aug. 4, 1942 |
| 2,570,802 | Hatteburg | Oct. 9, 1951 |
| 2,601,684 | Martin | July 1, 1952 |

FOREIGN PATENTS

| | | |
|---|---|---|
| 570,020 | France | Jan. 12, 1924 |